UNITED STATES PATENT OFFICE 2,683,733

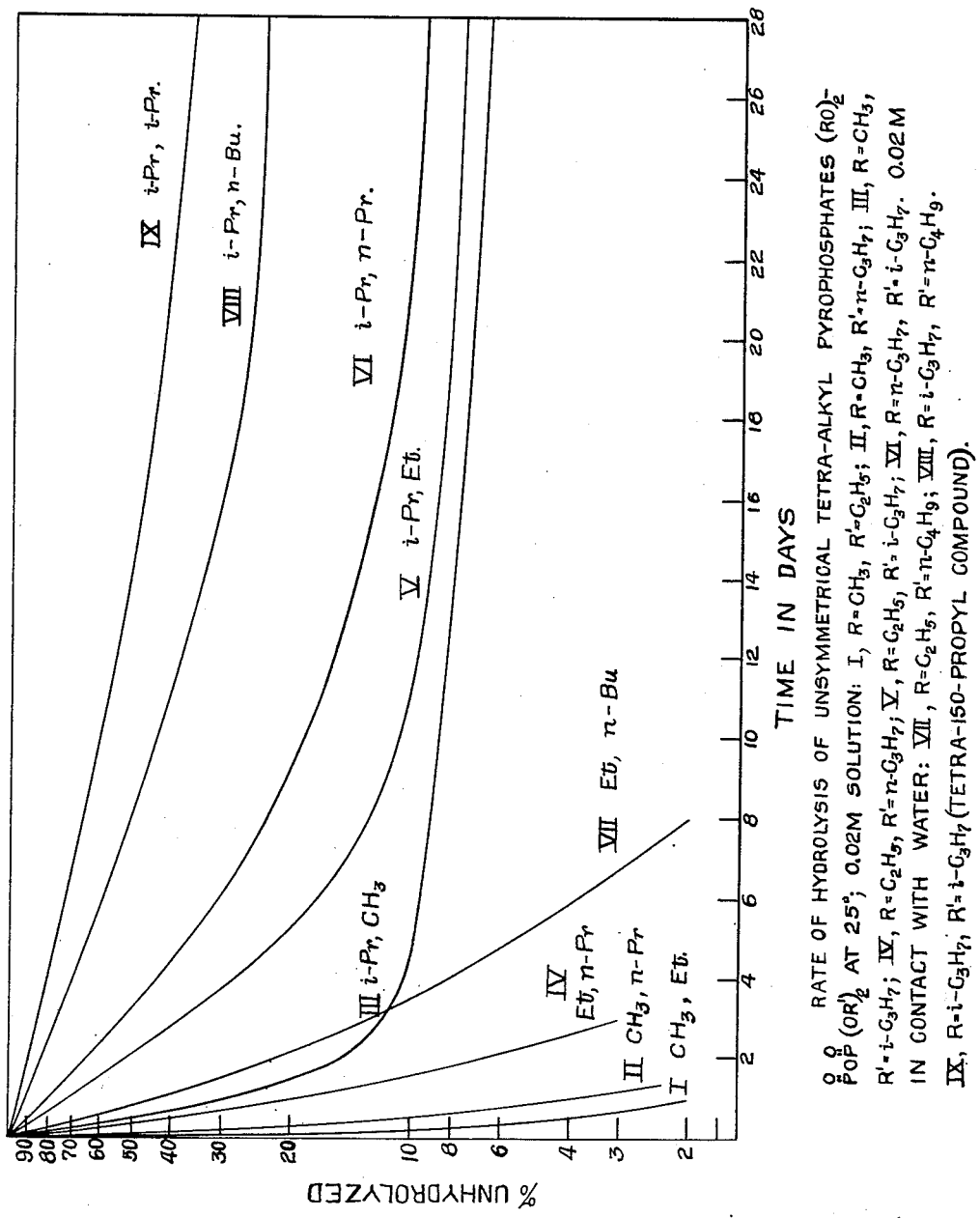

METHOD OF MAKING UNSYMMETRICAL TETRAALKYL PYROPHOSPHATES

Arthur Dock Fon Toy, Park Forest, Ill., assignor to Victor Chemical Works, a corporation of Illinois Application October 29, 1949, Serial No. 124,414

10 Claims. (Cl. 260—461)

This invention relates to methods of making unsymmetrical tetraalkyl pyrophosphates and to the compounds resulting therefrom, and relates particularly to such compounds containing two oxyisopropyl groups attached to a single phosphorus atom.

The compounds included in this invention are represented by the formula:

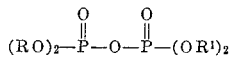

in which R is an alkyl group and $R^1$ is a different alkyl group. These compounds are referred to herein as unsymmetric since the pair of similar alkoxy radicals attached to one phosphorus atom of the pyrophosphate is not the same as the pair attached to the other phosphorus atom.

The products of the present invention may be prepared by the reaction of a dialkyl chlorophosphate with a different dialkyl acid phosphate in the presence of a tertiary amine. The tertiary amine acts as both a hydrogen acceptor and also as a catalyst since the reaction proceeds relatively slowly in the absence of the tertiary amine. An inert organic solvent is often used, though if the amine compound is present in large excess no other solvent is needed. However, I usually prefer to use some inert organic solvent in place of excess amine compound for reasons of cost. The reaction is preferably carried out at temperatures below the point at which decomposition of the tetraalkyl pyrophosphate begins. A practical upper limit is the reflux temperature of the solvent, and a practical temperature range is from about 0° to 75° C.

One procedure used is to dissolve substantially equal molar proportions of the phosphate reactants in an inert organic solvent, preferably at room temperature or similar low temperature that will prevent the phosphate compounds from reacting, and add thereto a tertiary amine in stoichiometric quantities or in a slight excess. If the phosphate compounds were added to the solvent at 100° C., for example, the phosphate compounds would react in undesirable side reactions. The inert organic solvents which may be employed include ether, carbon tetrachloride, benzene, toluene, and the like, with the solvent preferably having a lower boiling point than the tetraalkyl pyrophosphate product, in order that separation may be effected by distillation. The reaction is exothermic and upon addition of the tertiary amine the reaction proceeds at an appreciable rate with the temperature rising to the boiling point of the solvent if not controlled by cooling.

A modified procedure is used when the excess tertiary amine serves as the only solvent. In this case one of the phosphate reactants, preferably the diethyl chlorophosphate, is dissolved in the amine to which is slowly added the other phosphate reactant.

The desired product is separated from other products and by-products of the reaction and excess reactants, first, by filtration to remove the amine hydrochloride compound, and then preferably further purification by fractionation or solvent extraction, followed by removal of original solvent by distillation.

The tertiary amines preferably employed are liquids, although where a solvent is employed solid amines soluble in the solvent may be used. The liquid tertiary amines preferably have a boiling point below that of the pyrophosphates. Typical examples of tertiary amines include pyridine, triethylamine, alpha-picoline, quinoline and N-ethyl morpholine.

The symmetrical tetraalkyl compounds are well known, especially the tetraethyl pyrophosphate, which has been used extensively as an insecticide. Initially tetraethyl pyrophosphate is highly toxic; however, in the presence of water it is rapidly hydrolyzed to non-toxic diethyl phosphoric acid, thus, in effect, losing its value as an insecticide over a short period of time. For example, tetraethyl pyrophosphate is 50% hydrolyzed in six hours in a 0.02 M solution.

I have discovered that tetra-i-propyl pyrophosphate is remarkably resistant to hydrolysis, much more so than its normal isomer, or the next normal homologue, water-insoluble tetra-n-butyl pyrophosphate. Tetraethyl pyrophosphate is hydrolyzed to the extent of 90% in twenty-four hours, tetra-n-propyl pyrophosphate is 90% hydrolyzed in 2½ days, and tetra-n-butyl pyrophosphate is 90% hydrolyzed in thirty days, while the tetraisopropyl pyrophosphate is but 65% hydrolyzed after thirty days, the hydrolysis comparisons all being made at 0.02 molar concentrations at 25° C. The relative stability of the tetra-i-propyl compound may be further evidenced by hydrolysis data of Table 1.

The disadvantage of the tetraisopropyl compound is that in general it is less toxic than the tetraethyl compound. Its toxicity to warm blooded animals is but one-sixteenth that of tetraethyl pyrophosphate. I have discovered that by substituting two isopropoxy groups for the two ethoxy groups connected to one of the phosphorus atoms in the tetraethyl pyrophosphate, I am able to obtain a compound, while intermediate to tetraethyl pyrophosphate and tetra-i-propyl pyrophosphate in regards to toxicity and resistance to hydrolysis, is more toxic and more resistant to hydrolysis, than might be expected from a knowledge of the parent compounds. These properties are more fully set forth in Tables 1 and 2.

TABLE 1

*Rate of hydrolysis of tetraethyl, tetra-i-propyl, and diethyl di-i-propyl pyrophosphates in a 0.02 M solution at 25° C.*

| Days | Percent Hydrolyzed in Days | | | | | | | | |
|---|---|---|---|---|---|---|---|---|---|
| | ½ | 1 | 2 | 3 | 4 | 5 | 6 | 8 | 16 | 20 |
| Tetraethyl pyrophosphate | 71 | 90 | | | | | | | | |
| Tetra-iso-propyl pyrophosphate | | | 5 | 10 | 14 | 18 | 22 | 26 | 33 | 52 | 58 |
| Diethyl diisopropyl-pyrophosphate | | | 31 | 49 | 62 | 71 | 78 | 83 | 87 | 91.5 | 92 |

The new compound diethyl di-i-propyl pyrophosphate is a versatile insecticide, since though its toxicity is only slightly less than that of tetraethyl pyrophosphate, it is many times more stable than the latter compound, and, hence at a given concentration will be, in effect, more toxic for a longer period of time after application than the tetraethyl compound.

Similarly, other unsymmetrical tetraalkyl pyrophosphates containing two isopropyl groups possess unusual stability against hydrolysis, and may be of importance where the rate of hydrolysis is a factor.

In addition to uses as an insecticide, some of the dialkyl diisopropyl pyrophosphates may find use in medical therapeutics, for example, in treatment of myasthenia gravis, a muscular degeneration disease, as a substitute for tetraethyl pyrophosphate which has been found to hydrolyze too rapidly for this purpose.

While I have discovered that the unsymmetrical tetraalkyl compounds containing two isopropyl groups attached to one phosphorus atom, and in particular diethyl di-isopropyl pyrophosphate, are of special importance, the other unsymmetrical tetraalkyl pyrophosphates are also useful compounds, which, by proper choice of the alkyl groups, may be tailor-made to meet the requirements of an insecticide possessing residual toxicity for a desired length of time.

Toxicity data on a number of these compounds, and also a few symmetrical compounds for comparisons, are tabulated in Table 2. The toxicities are given in minimum lethal dose (milligrams per kilogram body weight) to cause fifty percent kill of male white mice subjected to intraperitoneal injection of the toxic material.

TABLE 2

$$(RO)_2-\overset{O}{\underset{\|}{P}}-O-\overset{O}{\underset{\|}{P}}-(OR^1)_2$$

| R | R¹ | LD₅₀, mg./kg. |
|---|---|---|
| CH₃ | C₂H₅ | 1.4 |
| CH₃ | n-C₃H₇ | 1.9 |
| C₂H₅ | C₂H₅ | 0.82 |
| C₂H₅ | n-C₃H₇ | 1.6 |
| C₂H₅ | i-C₃H₇ | 2.8 |
| C₂H₅ | n-C₄H₉ | 2.1 |
| n-C₃H₇ | i-C₃H₇ | 11.0 |
| i-C₃H₇ | i-C₃H₇ | 13.3 |
| i-C₃H₇ | n-C₄H₉ | 8.4 |

The accompanying drawing shows comparative hydrolysis rates of various compounds.

For comparative hydrolysis rates see Table 1. The hydrolysis tests were carried out in a 0.02 M solution at 25° C. The unsymmetrical compounds diethyl di-n-butyl pyrophosphate and di-i-propyl di-n-butyl pyrophosphate are not very soluble in water. For this reason the hydrolysis rates of these compounds were measured when 0.02 M solution of the compounds were continuously agitated in contact with water. In the single figure of the drawing, curve I is dimethyl diethyl pyrophosphate; curve II dimethyl n-propyl pyrophosphate; curve III is dimethyl diisopropyl pyrophosphate; curve IV is diethyl di-n-propyl pyrophosphate; curve V is diethyl di-i-propyl pyrophosphate; curve VI is di-n-propyl di-i-propyl pyrophosphate; curve VII is diethyl di-n-butyl pyrophosphate; curve VIII is di-n-butyl di-i-propyl pyrophosphate; and curve IX is tetraisopropyl pyrophosphate. Thus it will be seen that the isopropyl groups contribute greatly to the stability of the compounds of this invention.

As further illustration of my invention I offer the following examples:

*Example I.*—Forty grams (0.26 mol) of pure diethyl hydrogen phosphate and 52 g. (0.26 mol) of di-iso-propyl chlorophosphate dissolved in 100 cc. of absolute ether were allowed to react with 21.6 g. (0.274 mol) of distilled pyridine dissolved in 50 cc. of absolute ether. The addition was carried out at 30–31° C. over a period of 42 minutes. The mixture was stirred for one hour at 34° C. and then refluxed at 36–38° C. an additional half hour. The pyridine hydrochloride was filtered off, and the ether removed by distillation. The product obtained after distillation in a Hickman pot still (bath temperature 105° C.; at 0.01 to 0.006 mm.; distillation rate, drop per second) represented a 91% yield: $n_D^{25}$ 1.4810, sp. gr. 1.1322 at 25° C., free acidity 1.7 cc. N/10 NaOH/g., P. 19.2%.

*Example II.*—To 26.4 g. (0.145 mol) of di-iso-propyl phosphoric acid and 33.2 g. (0.145 mol) of di-n-butyl chlorophosphate in 200 cc. absolute ether, was added 15.5 g. (0.153 mol) of triethylamine in 25 cc. of absolute ether at 35–37° C. After completion of the reaction and separation of the triethylamine hydrochloride by filtration and solvent by distillation, the residue was distilled in a Hickman pot still at 0.007 mm. pressure; bath temperature 115–122° C. The distilled yield amounted to 87.0% with the following physical properties: $n_D^{25}$ 1.4235, sp. gr. 1.0682 at 25° C., free acidity 1.48 cc. N/10 NaOH/g., P. 16.3%.

*Example III.*—20.8 g. (0.114 mol) of di-i-propyl phosphoric acid and 23 g. (0.115 mol) of di-n-propyl chlorophosphate were allowed to react with 9.5 g. (0.12 mol) of pyridine in the presence of ether as a solvent. The crude product obtained from the reaction mixture was distilled in a Hickman still (bath temperature, 110–114° C., p, 0.003–0.009 mm.; distillation rate, drop 2–4 sec.). The distillate weighed 32.6 g. (82.7% yield). It had an initial acidity of 3.8 cc. N/10 NaOH/g. It was further purified by washing with sodium bicarbonate in brine and then redistilled. Only a 4% loss in product resulted in this purification step. The distillate had the following properties: $n_D^{25}$ 1.4210, sp. gr. 1.0949 at 25° C., free acidity 0.1 cc. N/10 NaOH/g.

*Example IV.*—Using absolute ether as a solvent, thirty-five grams (0.22 mol) of diethyl phosphoric acid and 51 g. (0.223 mol) of dibutyl chlorophosphate were allowed to react with 18 g. (0.228 mol) of pyridine. The crude product obtained after removal of the pyridine hydrochloride and ether solvent was distilled in a Hickman pot still (bath temperature 115–118° C.; p, 0.007 mm.; distillation rate drop 2–4 sec.). A 95.4% yield of distilled product was obtained; $n_D^{28}$ 1.4248, free acidity 1.4 cc. N/10 NaOH/g.

The foregoing detailed description has been given for clearness of understanding only and no unnecessary limitations should be understood therefrom.

I claim:

1. The method of making an unsymmetrical tetraalkyl pyrophosphate of the formula:

$$(RO)_2-\overset{O}{\underset{\|}{P}}-O-\overset{O}{\underset{\|}{P}}-(OR^1)_2$$

in which R is a lower alkyl group and $R^1$ is a different lower alkyl group, comprising reacting a dialkyl chlorophosphate with a dialkyl phosphoric acid in the presence of a tertiary amine, said dialkyl phosphoric acid containing a different pair of lower alkyl groups from those of the dialkyl chlorophosphate.

2. The method of claim 1 wherein the tertiary amine is pyridine.

3. The method of claim 1 wherein the reaction is carried out in the presence of an inert organic solvent.

4. The method of claim 1 wherein the reaction is carried out in the presence of ether.

5. The method of making an unsymmetrical tetraalkyl pyrophosphate of the formula:

$$(RO)_2-\overset{O}{\underset{\|}{P}}-O-\overset{O}{\underset{\|}{P}}-(OR^1)_2$$

in which R is a lower alkyl group and $R^1$ is a different lower alkyl group, comprising dissolving a dialkyl chlorophosphate and a dialkyl phosphoric acid in an inert organic solvent, said phosphate having lower alkyl groups different from those of said acid, adding a tertiary amine thereto in at least a stoichiometric quantity, and heating.

6. The method of making an unsymmetrical tetraalkyl pyrophosphate of the formula:

$$(RO)_2-\overset{O}{\underset{\|}{P}}-O-\overset{O}{\underset{\|}{P}}-(OR^1)_2$$

in which R is a lower alkyl group and $R^1$ is a different lower alkyl group comprising dissolving substantially equal molar quantities of a dialkyl chlorophosphate and a dialkyl phosphoric acid in an inert organic solvent, said dialkyl phosphoric acid containing a different pair of lower alkyl groups from those of the phosphate, adding thereto a tertiary amine as a catalyst and hydrogen chloride acceptor, separating the tertiary amine hydrochloride therefrom, and purifying the product.

7. The method of claim 6 in which each R is an isopropyl group and each $R^1$ is a lower alkyl group other than the isopropyl group.

8. The method of claim 6 in which each R is an isopropyl group and each $R^1$ is an ethyl group.

9. The method of claim 6 in which each R is an isopropyl group and each R' is an ethyl group and the reaction temperature is from 0 to 75° C.

10. The method of making an unsymmetrical tetraalkyl pyrophosphate of the formula:

$$(RO)_2-\overset{O}{\underset{\|}{P}}-O-\overset{O}{\underset{\|}{P}}-(OR^1)_2$$

in which R is a lower alkyl group and $R^1$ is a different lower alkyl group comprising dissolving a dialkyl chlorophosphate in a tertiary amine as a solvent, catalyst and hydrogen chloride acceptor and adding thereto a substantially equal molar proportion of a dialkyl phosphoric acid containing a different pair of lower alkyl groups from those of the phosphate, separating the tertiary amine hydrochloride therefrom, and purifying the product.

References Cited in the file of this patent

UNITED STATES PATENTS

| Number | Name | Date |
|---|---|---|
| 2,479,939 | Kosolapoff | Aug. 23, 1949 |
| 2,486,658 | Kosolapoff | Nov. 1, 1949 |

OTHER REFERENCES

McCombie et al.: J. Chem. Soc. (London), pages 380–82 (1945).

Toy: J. Am. Chem. Soc., vol. 70, pages 3882–3886 (1948).